United States Patent
Silverman

(10) Patent No.: US 7,780,745 B2
(45) Date of Patent: Aug. 24, 2010

(54) CONFORMAL LITHIUM POLYMER BATTERY

(76) Inventor: Martin S. Silverman, 850 Calle Plano, Suite C, Camarillo, CA (US) 93012

( * ) Notice: Subject to any disclaimer, the term of this patent is extended or adjusted under 35 U.S.C. 154(b) by 988 days.

(21) Appl. No.: 11/545,974

(22) Filed: Oct. 10, 2006

(65) Prior Publication Data

US 2007/0079500 A1   Apr. 12, 2007

Related U.S. Application Data

(60) Provisional application No. 60/725,342, filed on Oct. 10, 2005.

(51) Int. Cl.
*H01M 10/04* (2006.01)
(52) U.S. Cl. .......... 29/623.1; 29/623.4; 29/623.5
(58) Field of Classification Search .......... None
See application file for complete search history.

(56) References Cited

U.S. PATENT DOCUMENTS

| | | | |
|---|---|---|---|
| 3,413,708 A | 12/1968 | Norville et al | |
| 4,019,939 A | 4/1977 | Barbier et al. | |
| 4,271,639 A | 6/1981 | Talalay et al. | |
| 4,564,226 A | 1/1986 | Doherty, Jr. | |
| 4,754,535 A | 7/1988 | Valtiero | |
| 5,224,690 A | 7/1993 | Vaught | |
| 5,639,283 A | 6/1997 | Sato | |
| 5,897,974 A | 4/1999 | LaFleur | |
| 5,974,846 A | 11/1999 | Ash | |
| 6,030,421 A * | 2/2000 | Gauthier et al. | 29/623.1 |
| 6,740,268 B2 | 5/2004 | Hirayama | |
| 2004/0038090 A1* | 2/2004 | Faris | 429/12 |
| 2004/0048151 A1* | 3/2004 | Hayashi et al. | 429/162 |

* cited by examiner

*Primary Examiner*—Dah-Wei D Yuan
*Assistant Examiner*—Katherine Turner
(74) *Attorney, Agent, or Firm*—Bruce A. Jagger

(57) ABSTRACT

This invention is a method of fabricating a conformal lithium polymer battery comprising the steps of: selecting a slab of lithium polymer battery material of a desired height, containing a desired number of cells; freezing the slab; vertically cutting the slab to a desired shape; attaching a lead to each anode conductor; and attaching a lead to a each cathode conductor. The slab may contain one or many cells. The leads may be made of multistranded, metallic wire, metallic ribbon, low melting point alloy, self-healing metal, and litz wire. Attachment is accomplished so as to minimize tension on the leads. The cut slab may need to be deburred after cutting and before attaching leads. Preferably, burr formation is prevented by recessing the edge of the anodic or cathodic half cells.

45 Claims, 2 Drawing Sheets

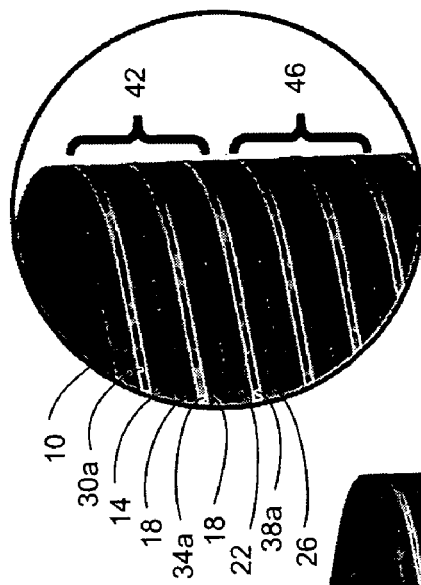
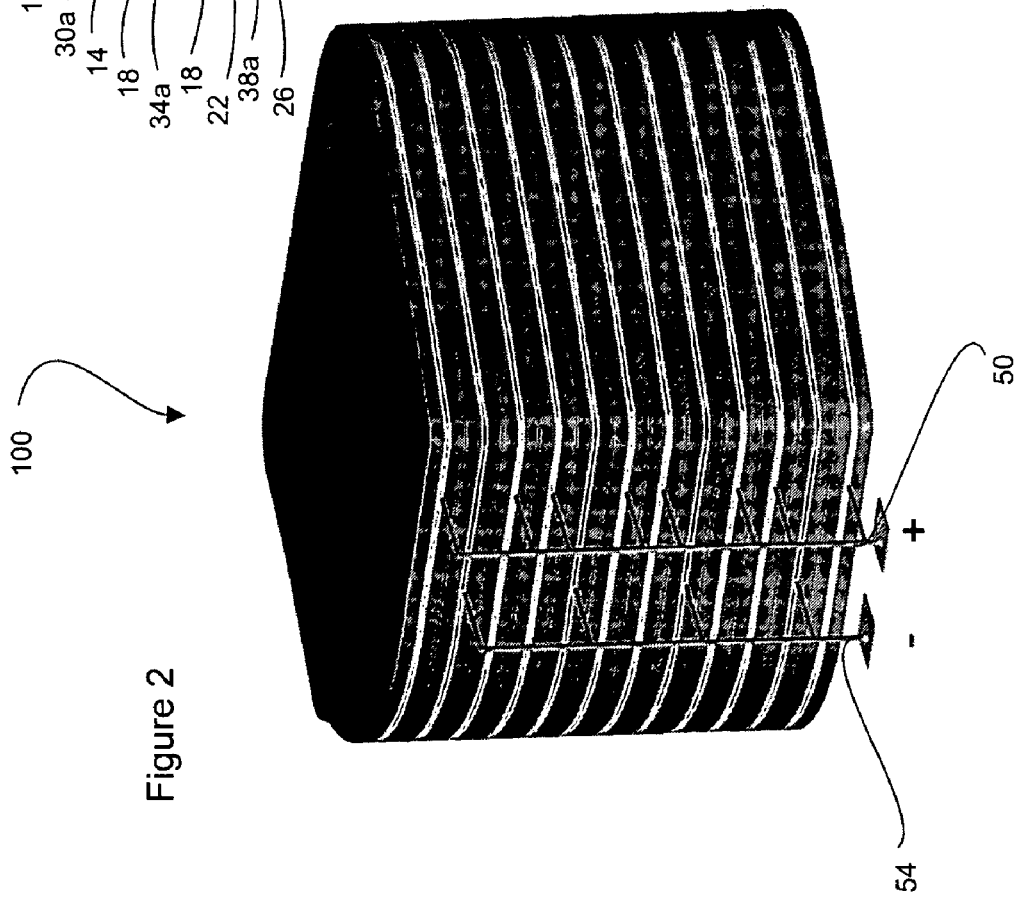

CONFORMAL LITHIUM POLYMER BATTERY

This application claims the benefit of U.S. Provisional Application Ser. No. 60/725,342, Filed Oct. 10, 2005.

BACKGROUND OF THE INVENTION (1) Field of the Invention

The present invention relates to the field of batteries and more particularly to the field of lithium polymer batteries.

(2) Description of the Related Art

With portable electronics such as cell phones, hearing aids and the like, the utility of the device is often limited by the battery's finite quantity of energy that it is able to store. One method of increasing the amount of energy contained within a battery is to make it larger. This is often difficult given that batteries are manufactured in various standard sizes. As such, available space within a battery-powered device that does not conform to the standard battery geometries and sizes is often left unused. With the advent of lithium polymer batteries, it has been suggested that such a battery might be formed to fit the available space within a device regardless of the geometry of the space. This space-filling concept will be referred to as a conformal battery. While such lithium polymer conformal batteries have been suggested, due to manufacturing difficulties this conformal characteristic has not yet been implemented. Thus, lithium polymer batteries are available only in relatively standard prismatic shapes. (Commonly available rectangular lithium polymer batteries are called prismatic.) These prismatic shapes in many instances fail to utilize the full extent of the space that is available within an electronic portable device.

Development of a battery which can fit into available space, thus providing more energy and longer battery life represents a great improvement in the field of batteries and satisfies a long felt need of the battery engineer.

SUMMARY OF THE INVENTION

The present invention is a method by which a conformal lithium polymer battery can be efficiently constructed that can fill the space available, be it rectilinear or irregular (polyhedral) in shape. This conformal space-filling shape applies in all three dimensions.

This invention is a method of fabricating a conformal lithium polymer battery comprising the steps of:

selecting a slab of lithium polymer battery material of a desired height;

freezing the slab;

vertically cutting the slab to a desired shape thus forming a cut edge;

attaching an anode lead to each anode conductor of the cut slab along the cut edge while maintaining the cut slab frozen; and attaching a cathode lead to a each cathode conductor of the cut slab along the cut edge while maintaining the cut slab frozen.

The slab may contain one or many cells. The leads may be made of single or multistranded, metallic wire, metallic ribbon, low melting point alloy, self-healing metal, and litz wire. Attachment is accomplished so as to minimize tension on the leads. The cut slab may need to be deburred after cutting and before attaching leads. The cut edge may be inspected for burrs before deburring is performed. The preferred method, however, is to prevent burr formatin by recessing the edge of each anodic half cell or each cathodic half cell by mechanical means, blowing away dust; and insulating the recessed edges with non-conductive polymer.

Lead attachment my be accomplished by a number of methods including: wire bonding; wedge bonding; adhering the lead to the electrode with conductive epoxy, anistotropic conductive adhesive or conductive thermoplastic; stapling with microstaples; adhering the lead to the electrode by electropolymerization; welding the lead to the electrode with micro welding; and growing a lead in place by electroless plating, electro-plating or a combination of electroless plating and electroplating.

Of course the leads should be insulated. Preferably the insulation is thermoplastic. If there is more than one cell in the slab, the distal ends of the leads may be connected together so that the cells are connected together in series, in parallel or some in series and the remainder in parallel. After the leads have been attached to the cut slab and connected together, the assembly will preferably be wrapped with standard packaging for lithium polymer batteries or a shrinkable form fitting version thereof.

This invention is a form of lithium polymer battery with the following advantages: the battery is conformal in that it can be made to fit the available space for instance within a portable electronic device, the steps of cell fabrication and determination of the final cell size and configuration become independent, as such, cell manufacture and battery sizing and shape can be conducted by separate entities. For instance, battery packagers do not need to fabricate their own cells but can obtain them from other manufactuers of cells. Thus, no cell fabrication is needed and battery packagers can make the batteries. This invention eliminates the problem of making the chemistry and the specialized and expensive cell lamination step. Because the starting material for the conformal battery is purchased pre-made from a battery manufacturer, this invention eliminates the considerable expense of formulating and producing the materials for the anodes and cathodes as well as combining the anodes and cathodes into battery cells. It is very expensive to make a specific battery configuration. Once the battery manufactures have designed and produced a specific battery configuration, they will not produce others because of the expense of retooling. Consequently, electrical device manufacturers are forced to design devices to around available battery configurations. This invention allows the electrical device manufacturers to optimize the characteristics of their device for the consumer and without the aforementioned constraints since they are now able to modify the available batteries to meet their requirements. This has the potential to change the entire portable electronic industry.

This invention particularly enables integration of rechargeable lithium batteries within a hearing aid.

An appreciation of the other aims and objectives of the present invention and an understanding of it may be achieved by referring to the accompanying drawings and description of a preferred embodiment.

BRIEF DESCRIPTION OF THE DRAWINGS

FIG. 2 is a three dimensional view of one design of a conformal lithium polymer battery.

FIG. 3 is an enlarged view of a portion of FIG. 2.

DETAILED DESCRIPTION OF THE PREFERRED EMBODIMENT

Figure 1:
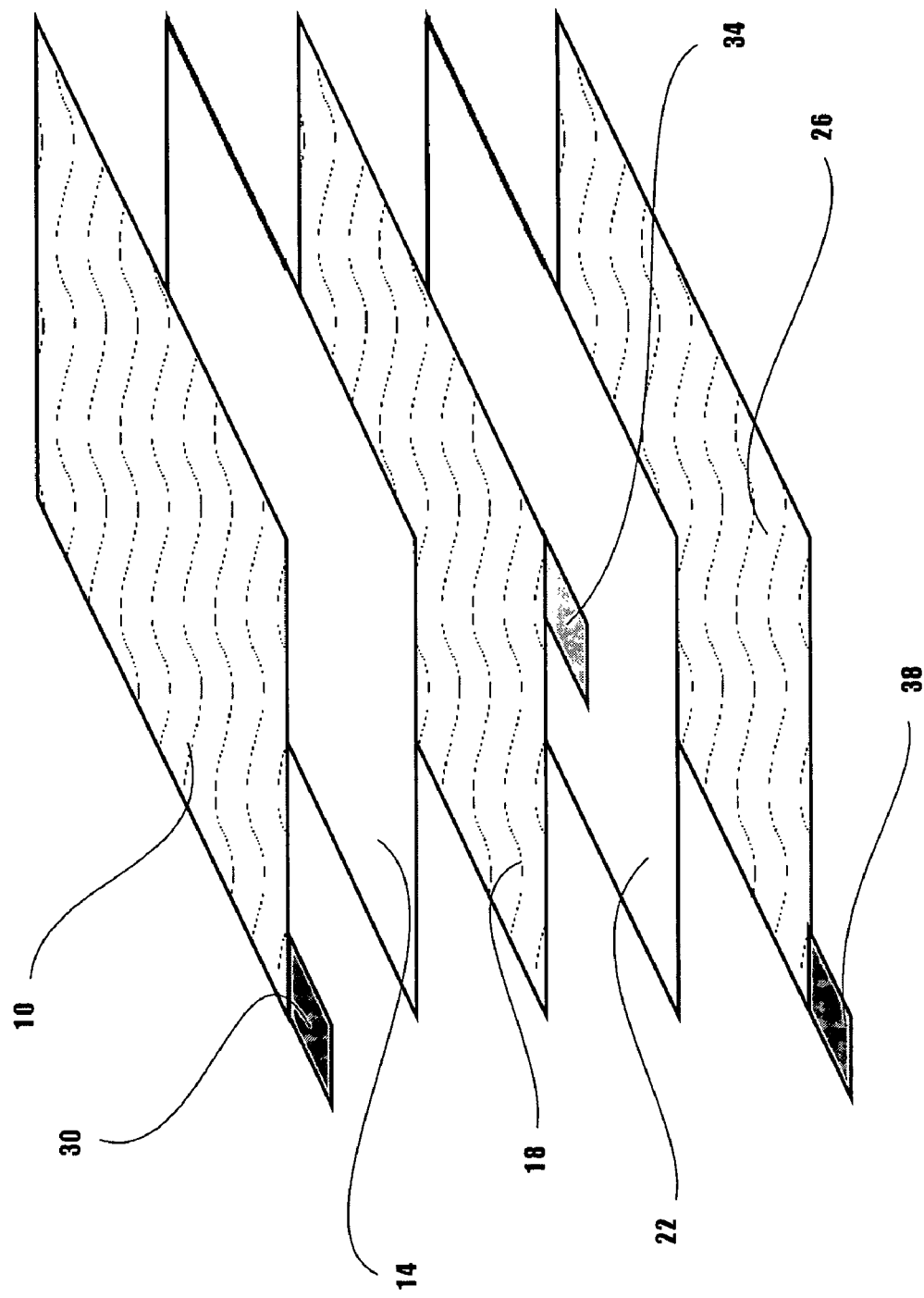
FIG. 1 is an exploded diagram of a standard (prior art) lithium polymer battery

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is an exploded diagram of a one cell of a standard (prior art) lithium polymer battery. Lithium polymer batteries are composed of a stack of cells. The common configuration of each cell has an anode layer 18 sandwiched between two cathode layers 10, 26. These cells are then stacked one on top of another to provide the desired battery thickness.

Lithium polymer batteries have the same common electrochemistry as conventional lithium ion batteries—they have lithiated oxide cathodes 10, 26 and a graphite anode 18 held together in a binder matrix of polyvinlydiene fluoride and coated and/or laminated to a current collector grid (not visible in this Figure). A tab 30, 34, 38 at the end of each current collector grid is used for electrical connection. Each cell contains highly porous separators 14, 22, which convert to gels when a minimum amount of electrolyte is added to operate the cell. The anodes 18 and cathodes 10, 26 of each cell are usually connected in parallel.

Lithium polymer batteries have comparable energy density to lithium ion batteries. The cells are sealed in a plastic aluminum laminate, so if the battery sees an overcharge condition, the seal ruptures and vents any gases due to electrolyte oxidation and the cell shuts down. When lithium ion batteries are overcharged the steel or aluminum casings tend to fragment, resulting in metal shards.

FIG. 2 is a three dimensional view of one design of conformal lithium polymer battery 100. FIG. 3 is an enlarged view of a portion of FIG. 2. The starting material is a standard prismatic lithium polymer battery having the desired thickness. Examining in detail the first cell 42, each cell of such a battery has the following structure:

a cathode 10;
a cathode conductor 30a;
a separator 14;
an anode 18;
an anode conductor 34a;
an anode 18;
a separator 22;
a cathode conductor 38a; and
a cathode 26.

To manufacture this invention, a standard prismatic battery of the desired thickness is cut to fit the profile of the space which it is to occupy. After it is cut, each layer (eg, every anode 18 and cathode 26) of the battery is connected to a conductive material such as copper wire, metal ribbon, conductive plastic, and the like. Such conductive leads 50, 54 can then be used to connect the various layers of the battery.

The leads 50, 54 should allow for expansion and contraction of the battery stack that occurs during charging and discharging. Therefore the leads 50, 54 may be composed of a multi-stranded wire; or ribbon, or a low melting point alloy or metal that will allow for a self healing connection to be made. Another alternative is litz wire, which is wire constructed of individual film insulated wires bunched or braided together in a uniform pattern of twists and length of lay. To accommodate the expansion and contraction that occurs during battery use, the leads 50, 54 can be laid out in such a manner as to minimize tension on the leads, and their connections to the battery and to their distal connections onto their connecting terminals. This can be accomplished by allowing the body of the leads to move relative to their connections. This can be accomplished by laying the insulated wires leads along the plan of the battery stack (eg, parallel) for some distance, say several millimeters along the circumference of the cut edge of the battery stack before their distal ends are connected to their connection terminals away from the battery stack. Thus, if the battery stack expands and contracts relative to the packaging and the distal connecting terminals, the movement and therefore the torsional and shear stress created by this relative movement will be distributed along this extended body of the connector. This will minimize local and high magnitude stress on the connector at any given point. This in turn will increase the life of the connectors.

If it is desired that the individual cells within the battery construction be configured in an electrically parallel fashion, then the free ends of the conductors 50, 54 that have been attached to the battery layers can be brought into continuity such that all the anodes are connected together and likewise, all of the cathodes layers are connected together. Alternatively, one might wish that the individual cells that compose the battery to be wired such that they form an electrical series configuration. This is accomplished by connecting the wire that is in continuity with the first anode layer to be in continuity with the wire or conductor that is connected to the cathode of the second battery cell. The conductor that is attached to the anode of the second battery cell is then brought in continuity with the conductor connected to the third cell's anode. The conductor connected to the cathode of the third cell is then brought into continuity with the conductor connected to the anode of the fourth cell. This anode to cathode to anode to cathode wiring is continued until all of the cells of the battery are wired in series.

However, the connectivity of the individual cells within the conformal battery can be made such that a desired number of cells are wired in parallel while the other cells are wired in series. Further, with connectivity between the cells can be fully dynamic such that they can be in parallel in one instance and in series in another. By so doing a single battery can provide different voltages and current delivering capabilities directly to the electronic device. Such a dynamic wiring is described in the inventor's U.S. Pat. No. 6,731,002.

In cutting the starting battery material to form the desired conformal battery shape, it is important that the means used to cut the starting material does not cause electrical shorting to occur between the stacked battery layers that make up the lithium polymer battery. A number of cutting procedures may be used to avoid the aforementioned shorting. A fine saw blade or wire blade may be used. Other methods that may be used are laser cutting, jet cutting or electrical discharge machining, providing non-aqueous solvents are used.

Preferably, the battery slab 100 is frozen prior to cutting. In this case freezing is defined to be a temperature between that of dry ice (−78.5° C., or −109.3° F.) and liquid nitrogen (−196° C. or −321° F.). Being frozen, the individual layers will not distort thus precluding the formation of electrical shorts between the cell layers. Once frozen, a thin saw blade can be used to cut the desired shape from the frozen battery. Following cutting the cut edges can be inspected and tested for potential shorts. For instance, burrs (not shown) that have formed shorts or those that may form shorts can be removed.

To identify the presence of burrs causing electrical shorting the electrical potentials of the anode and cathode pairs (or actually cathode-anode—cathode galvanic sandwiches) can be monitored. Those cells that are shorted or partially shorted (a relatively high resistance electrical bridge) will display a lower voltage than other cells that do not posses such shorts. Further, as shorting continuously drains the cell, the measured voltage is dynamic and will change with time (e.g. the voltage between the anodes and cathodes continuously decreases). Further, there will be an internal check as there are actually two distinct pairs of electrochemical couples. The first cathode and the anode form one pair while the anode and the bottom cathode form another. Since burr induced shorting is a rather infrequent stochastic event, it is unlikely that both galvanic pairs would be shorted and shorted to the same degree (showing the same voltage depression as well as the same rate of decline). Therefore, comparing the voltages of the two pairs will further help identify such burr-induced shorts.

Once identified using the cell's own signal, the burr(s) will be removed, or neutralized by abrading the cut surface of the cell stack. To efficiently remove burrs by abrasion, the abrading motion should be parallel to the plane of the cell laminas. This motion will align any burrs that are not completely removed into the plane of the half cell, be it an anode or cathode thus eliminating the possibility of a short.

However the preferred method, which is much less prone to burr shorting, is profiling of a small region along the cut edge of the cell stack such that all of one half cell (e.g. anode or cathode) is recessed into the body of the cell stack (not shown) by the use of a micro dado bit. In an area that is somewhat removed from the first dado site, the alternate type of half-cell will be similarly recessed. The dado grooves will be wide enough to remove all of one type of half cell (say the cathodes) as well as a portion of the protruding and interlacing anodes. After a blowing with dry nitrogen (to avoid both oxygen and water vapor when using lithium chemistries and non-aqueous electrolytes) to blow away the dust, bridging across this uneven configuration will be rendered almost impossible. Next, a nonconductive polymer that does not freeze at the lowered temperatures required for stabilization of the battery laminas is applied to the dadoed depressions, thus further insulating them from unintentional conductivity as well as stabilizing the rather friable metal oxides and carbon powders used within the half cells of the battery. The polymer may be catalyzed and may in addition be UV cured.

After the polymer is cured a very small diameter, very rigid wire is heated at its interface with the protruding half cells (by current generated from the cells themselves) such that the thin wire is able to locally and momentarily melt the polymer within the lithium polymer battery to facilitate its penetration of each protruding half cell it encounters as the wire traverses the succeeding half cells orthogonal to the laminas of the battery stack. Further, the resolidifying battery polymer previously softened or melted by the traverse of the hot wire will help stabilized the wire. After both dadoed areas are so prepared, a bead of conductive polymer (not shown) may be applied to the wire and its interface with the isolated half-cell fingers to further increase the stability as well as conductivity of the connection. Note that the draping of the wire lead with a conductive polymer will not result in shorting between half cells as the dado cuts were made well enough to remove all exposed interface of the two chemistries. In addition, the underlying non-conductive polymer that was applied to the dadoed grooves further insulates any previously exposed counter electrode material.

After the profile of the conformal battery is sawn, electrical connections must be made to the individual cell layers that compose the lithium polymer battery.

First it may be necessary to identify anode and cathode layers using voltametry. This refers to using voltage as a means to identify the anodes (positive lamina) and cathodes (negative lamina) of the battery stack. Essentially any method of sensing the relative electrical potential between and amongst the lamina that compose the lamina stack should work.

The methods by which the conductors are attached to the anodes 18 and cathodes 26 include:

Wire Bonding or Wedge Bonding—Wire bonding is an electrical interconnection technique using thin wire and a combination of heat, pressure and/or ultrasonic energy. Wire bonding is a solid phase welding process, where the two metallic materials (wire and surface) are brought into intimate contact. Once the surfaces are in intimate contact, electron sharing or interdiffusion of atoms takes place, resulting in the formation of a wire bond. In the wire bonding process, bonding force can lead to material deformation, breaking up any contamination layer and smoothing out surface asperity, which can be enhanced by the application of ultrasonic energy. Heat can accelerate interatomic diffusion and thus bond formation. Equipment and materials are available from many manufactures.

The wire used in wire bonding is usually made either of gold or aluminum, although copper wires are starting to gain attention in the semiconductor manufacturing industry. There are two common wire bond processes: gold ball bonding and aluminum wedge bonding. During gold ball bonding, a gold ball is first formed by melting the end of the wire (which is held by a bonding tool known as a capillary) through electronic flame-off (EFO). This free-air ball has a diameter ranging from 1.5 to 2.5 times the wire diameter. Free air ball size consistency, controlled by the EFO and the tail length, is critical in good bonding.

The free-air ball is then brought into contact with the bond pad. Adequate amounts of pressure, heat, and ultrasonic forces are then applied to the ball for a specific amount of time, forming the initial metallurgical weld between the ball and the bond pad as well as deforming the ball bond itself into its final shape In chip manufacture, the wire is then run to the corresponding finger of the lead frame, forming a gradual arc or "loop" between the bond pad and the lead finger. Pressure and ultrasonic forces are applied to the wire to form the second bond (known as a wedge bond, stitch bond, or fishtail bond), this time with the lead finger. The wire bonding machine or wire bonder breaks the wire in preparation for the next wire bond cycle by clamping the wire and raising the capillary.

During aluminum wedge bonding, a clamped wire is brought in contact with the bond pad. Ultrasonic energy is then applied to the wire for a specific duration while being held down by a specific amount of force, forming the first wedge bond between the wire and the bond pad. The wire is then run to the corresponding lead finger, against which it is again pressed. The second bond is again formed by applying ultrasonic energy to the wire. The wire is then broken off by clamping and movement of the wire.

Gold ball bonding is faster than wedge bonding because it is non-directional. However, gold ball bonding can not be used in hermetic packages because gold will melt at sealing temperatures. Unlike aluminum wedge bonding, gold thermosonic bonding requires heat to match the hardness of aluminum to the gold.

One preferred provider is X-Wire technology from Microbonds Inc. of Ontario Canada.

Conductive Epoxy. Conductive epoxy adhesives are typically silver filled such as materials available from Resin Technology Group, LLC Conductive Thermoplastic. Multiple technologies are available to impart conductive properties into thermoplastic resins that are otherwise insulative in nature, providing the exact degree of conductivity required, whether anti-static, static dissipative, ESD protection, conductive, or EMI/RFI shielding. These specialty compounds are tailored to span the surface resistivity spectrum from 100 to 1012 ohm/sq. and can be formulated for injection molding or extrusion processes. All types of host resins can be compounded with a variety of conductive materials to form conductive thermoplastics.

Micro Staples. The staples have teeth that are designed to penetrate through the depth of the protruding layer such that the teeth intercept the substrate foil in at least one location and preferably in multiple locations.

Electropolymerization—Some doped polymers, such as polyphenylne-vinylene/AsF5, are highly conductive. The process of making them is governed by the electrode potential and by the reaction time, which allows control of the thickness of the resulting film. The polymerization occurs locally and strictly on the electrode surface. The dopant is entrapped in close proximity to the electrode surface. In addition, the combination of different conducting or non-conducting polymers allows the building of multilayer structures with extremely low thickness leading to fast responding sensors with reduced interferences. The film can be generated by cycling the potential (potentiodynamically) or at a fixed potential (potentiostatically). The latter allows the more precise control of the film thickness and its growth.

Micro Welding. Conventional manual laser welding has a typical minimum focus diameter of approximately 0.3 mm. Some special applications like welding of small wires, filling of micro pores or working in the vicinity of heat sensitive gem stones require a much smaller focus diameter and higher precision. Micro welding reduces the minimum welding spot diameter to far below 0.1 mm. With micro welding, it is possible to weld 20 μm diameter wires or even 10 μm thick foils—reproducibly and with excellent quality.

Anisotropic conductive adhesives, such as: 111-29 manufactured by Creative Materials Incorporated, Tyngsboro, Mass. 01879; LID3545 manufactured by Loctite of Dublin, Ireland; and 9703 Electrically Conductive Tape manufactured by 3M. Anisotropically conductive adhesives are pastes or films of thermoplastics or b-stage epoxies. They are filled with metal particles or metal coated polymer spheres to a content that assures electrical insulation in all directions before bonding. After bonding the adhesive becomes electrically conductive in the z-direction. The metal particles are typically nickel or gold and these metals are also used to coat polymer spheres.

For instance, a flexible circuit board having a multiplicity contacts coated with an anisotropic adhesive could be applied to the cut edge of the battery stack. Those contacts that show a low resistance contact with the desired layer within the battery stack would then be used as the battery contact for that specific cell layer. To be capable of making such a contact that in addition does not span across adjacent galvanic pairs (e.g., an anode and a cathode) and thus produce a short circuit, it would be necessary that the width of the contact be less than the thickness of the separator material between the anode and cathode.

Differential contact formation by electroless plating. Electroless plating is a plating method that does not require the application of an electrical charge and current, but instead relies on the inherent and relative redox states of the substrate and the material to be plated. Therefore the lead material or some component of the lead material that is applied to a specific lamina will be reduced to its metallic or conductive form when brought into contact with the lamina without the need for the superimposition of an external or applied voltage and current.

Differential contact formation by electro-plating. This is the application of an external voltage and current to the substrate and contacting solution that contains dissolved metal in order to deposit (plate) metal onto the substrate.

Combination of electroless and electro-plating. Refers to the use of both electroless and electrode plating for making connections onto the anodes and cathodes. For instance, because the cathodes generate electrons and electrons can reduce metal salts and the like that may be used on the leads as the starting material to form the conductive bridge between the lead and the anode, no external charge may be required to drive the plating reaction for connections onto the cathodes. The anodes absorb electrons and thus form an oxidizing environment. Therefore, in order to plate a bridge between the cathode and the lead, it may be required to apply an external potential to overcome and override and reverse the direction of current flow. As the lithium polymer battery is inherently "rechargeable" such reversal of current flow is possible and non-damaging to the battery. Therefore, in this example, while the anode leads may be joined to the anodes by electroless plating, the cathodes may require the application of an external potential for such plating and as such would be formed using an electro-plating process.

Initially anodes 18 can be identified as they will be electron producing and thus will plate metal onto the copper expanded foil substrate. With appropriate salt of copper a copper bridge will form. Next, each cathode 26 will release electrons when their juxtaposed anodes 18 are used for recharging. Thus, metal will plate onto the aluminum terminal foils.

The conductors 50, 54 must be insulated to protect from shorting onto an adjacent battery lamina or other components or conductors. Preferably, a thermoplastic insulator is used, so that the insulation melts away from the tip of the conductor as it is applied to the lamina that it is to connect to. Melting can be accomplished by a variety of methods such as: ultrasonic wire bonding; passing a current through the wire so to generate high localized temperature at the initially high resistance junction between the lead and the lamina substrate; and focused laser energy at the lead/lamina junction.

Once the insulation has melted back the lead tip will form a better and more secure junction with the battery lamina. Upon re-solidifying, the insulation also assists in mechanically bonding the lead to the lamina.

After the conductors 50, 54 are connected to the cell layers, the conformal battery can be wrapped within the standard packaging used for packaging lithium polymer batteries, a shrinkable version thereof, or the conformal battery can be coated with an insulating conformal coating composed of a flexible or semi-rigid or rigid polymer or the like.

If the battery chemistry is organized as a jellyroll (not shown), different methods can be used for attachment of the conductors to the anode and cathode layers of the battery cell(s). If cut in cross-section the foil ends will be located on the periphery of the jellyroll. As such, only one connection each (one for the anode layer and one for the cathode layer) need be made. As long as the void created by the mandrel is not very large, then the connections will be easier to make and still maintain relatively high energy density.

The preferred steps of fabricating batteries in accordance with this invention include Selecting a slab 100 of lithium polymer battery material of the correct height Freezing the slab 100

Cutting the shape with a core drill, thin wire blade, small diameter miter bit or any other suitable cutting device. Preferably the cutter is non-conductive. Core drills can be used if a circular profile is desired. The other devices are used if irregular shapes are desired. Cutting is performed vertically through each lamina.

Differential profiling or mitering of the anode and cathode layers. This should be done while the battery stack is frozen and prior to placement of the connectors or flying leads. In this manner anode or cathode layers can be better exposed and isolated from each other. This can allow for a connector to be driven perpendicular to the anode and cathode chemistry stack thus connecting all of the anodes together in one location and all of the cathodes together in another location.

Attaching the leads to the anodes and cathodes along the cut edge of the cut out battery stack while the stack is kept frozen. Local areas that receive the contacts may momentarily become unfrozen during the lead attachment, but will return to a frozen state once the lead is attached.

A polymer can then be applied to the connections made to the battery. This polymer can be made conductive by using a conductive polymer that is inherently conductive or that is filled or loaded with a conductive material such as carbon or copper particles for the anode and aluminum particles for the cathode or the use of an inert metal such as stainless steel particles for both anode and cathode connections.

The cut edge of the battery stack can be inspected and tested for shorts between the anodes and cathodes. Any bridging material can be removed by physical means such as brushing or bursts of gas jets or fluid jets (eg, liquid nitrogen or other inert, non-reactive media)

For the lithium ion conformal battery design, the anode and cathode layer interconnects can be made in a "zebra" pattern (not shown) on the inside facing surface of the shrink enclosure. This refers to a zebra connector material. A zebra connective material is composed of an interlacing of conductive and non conductive material. The width, periodicity and spacing or "pitch" of the conductors within the non-conductive interlaced material should be smaller than the contact points onto which the zebra connector will be applied. As the zebra pitch is much smaller than the pitch of the contact points, in no instance will one conductor within the zebra strip contact more than one contact point. Thus, by probing the distal end of the zebra strip, one can isolate one or more conductors within the zebra array that is in electrical continuity with the contact point of interest. Such probing can, of course be automated and thus is of considerable use in making connections onto very small and closely positioned contact points.

This interconnect pattern is novel. Selection of the interconnects can be made by active selection and the selection can be dynamic. Dynamic selection can be performed by logic elements or a microprocessor of micro controller, etc. associated with the battery. Shorted cells can be automatically eliminated. This is an extension of the digital battery concept as disclosed in U.S. Pat. No. 6,731,002. This will allow the cell to continue to function if a cell is shorted or bad. The selection can be "hard wired" and the appropriate connections made by wire bonding or by laser cutting the traces that are not appropriate or not needed. This is the standard approach to configuring and connecting the anodes and cathodes contained within a battery in that there is no provision for such interconnectivity to be mutable. It is "hard wired" if there is no method provided for changing the connectivity of the anodes and cathodes.

This technique will allow battery packagers to participate in the production of the battery. Presently, battery packagers configure the connectivity between batteries that they receive from the battery manufacturers (i.e. they can make a battery pack or array by wiring together the individual batteries that they receive from the manufactures and thus make a larger battery for say a lap top computer from a bunch of smaller cylindrical batteries). With this invention, the battery packagers are not limited to configuring and combining individual batteries, but now can configure the connectivity within a single battery. Further this "conformal" battery can have essentially any shape and size desired.

The following reference numerals are used on FIGS. 1 through 3:

10 cathode
14 separator
18 anode
22 separator
26 cathode
30 cathode connector
30a cathode conductor
34 anode connector
34a anode conductor
38 cathode connector
38a cathode conductor
42 first cell
46 second cell
50 anodeleads
54 cathode leads
 cut slab of lithium polymer battery material Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of fabricating a conformal lithium polymer battery comprising the steps of:
   a) selecting a slab of lithium polymer battery material of a desired height;
   b) freezing said slab;
   c) vertically cutting said slab to a desired shape thus forming a cut edge;
   d) attaching a lead to an anode conductor of said cut slab along said cut edge while maintaining said cut slab frozen; and
   e) attaching a lead to a cathode conductor of said cut slab along said cut edge while maintaining said cut slab frozen.

2. A method as claimed in claim 1 in which said lead is selected from the group consisting of multistranded, metallic wire, metallic ribbon, low melting point alloy, self-healing metal, and litz wire.

3. A method as claimed in claim 1 in which said lead attaching steps are accomplished so as to minimize tension on said leads.

4. A method as claimed in claim 1 further comprising the step of deburring said cut slab after cutting and before attaching leads.

5. A method as claimed in claim 1 further comprising the steps:
   a) inspecting said cut edge for burrs; and
   b) removing said burrs;
after cutting and before attaching leads.

6. A method as claimed in claim 1 further comprising the steps of:
   a) recessing the edge of one half cell by mechanical means;
   b) blowing away dust; and
   c) insulating the recessed edge with non-conductive polymer.

7. A method as claimed in claim 1 in which said attaching step is accomplished by wire bonding.

8. A method as claimed in claim 1 in which said attaching step is accomplished by wedge bonding.

9. A method as claimed in claim 1 in which said attaching step is accomplished with conductive epoxy.

10. A method as claimed in claim 1 in which said attaching step is accomplished with conductive thermoplastic.

11. A method as claimed in claim 1 in which said attaching step is accomplished with microstaples.

12. A method as claimed in claim 1 in which said attaching step is accomplished by electropolymerization.

13. A method as claimed in claim 1 in which said attaching step is accomplished by micro welding.

14. A method as claimed in claim 1 in which said attaching step is accomplished with anistotropic conductive adhesive.

15. A method as claimed in claim 1 in which said attaching step is accomplished by electroless plating.

16. A method as claimed in claim 1 in which said attaching step is accomplished by electro-plating.

17. A method as claimed in claim 1 in which said attaching step is accomplished by a combination of electroless plating and electro-plating.

18. A method as claimed in claim 1 in which said leads are insulated.

19. A method as claimed in claim 1 in which said leads are insulated with thermoplastic insulator.

20. A method as claimed in claim 1 further comprising the step of wrapping said cut slab and attached leads with standard packaging for lithium polymer batteries.

21. A method of fabricating a conformal lithium polymer battery comprising the steps of:
   a) selecting a slab of lithium polymer battery material of a desired height; said slab containing a plurality of cells;
   b) freezing said slab;
   c) vertically cutting said slab to a desired shape thus forming a cut edge;
   d) attaching an anode lead to each anode conductor of said cut slab along said cut edge while maintaining said cut slab frozen; and
   e) attaching a cathode lead to a each cathode conductor of said cut slab along said cut edge while maintaining said cut slab frozen.

22. A method as claimed in claim 21 in which said leads are selected from the group consisting of multistranded, metallic wire, metallic ribbon, low melting point alloy, self-healing metal, and litz wire.

23. A method as claimed in claim 21 in which said lead attaching steps are accomplished so as to minimize tension on said leads.

24. A method as claimed in claim 21 further comprising the step of deburring said cut slab after cutting and before attaching leads.

25. A method as claimed in claim 21 further comprising the steps:
   a) inspecting said cut edge for burrs; and
   b) removing said burrs;
after cutting and before attaching leads.

26. A method as claimed in claim 21 further comprising the steps of:
   a) recessing the edge of each anodic half cell or each cathodic half cell by mechanical means;
   b) blowing away dust; and
   c) insulating the recessed edges with non-conductive polymer.

27. A method as claimed in claim 21 in which said attaching step is accomplished by wire bonding.

28. A method as claimed in claim 21 in which said attaching step is accomplished by wedge bonding.

29. A method as claimed in claim 21 in which said attaching step is accomplished with conductive epoxy.

30. A method as claimed in claim 21 in which said attaching step is accomplished with conductive thermoplastic.

31. A method as claimed in claim 21 in which said attaching step is accomplished with microstaples.

32. A method as claimed in claim 21 in which said attaching step is accomplished by electropolymerization.

33. A method as claimed in claim 21 in which said attaching step is accomplished by micro welding.

34. A method as claimed in claim 21 in which said attaching step is accomplished with anistotropic conductive adhesive.

35. A method as claimed in claim 21 in which said attaching step is accomplished by electroless plating.

36. A method as claimed in claim 21 in which said attaching step is accomplished by electro-plating.

37. A method as claimed in claim 21 in which said attaching step is accomplished by a combination of electroless plating and electro-plating.

38. A method as claimed in claim 21 in which said leads are insulated.

39. A method as claimed in claim 21 in which said leads are insulated with thermoplastic insulator.

40. A method as claimed in claim 21 further comprising the steps of:
   a) electrically connecting the distal ends of said anodic leads together; and
   b) electrically connecting the distal ends of said cathodic leads together;
whereby the cells of said cut slab are connected together in parallel.

41. A method as claimed in claim 21 further comprising the step of electrically connecting the distal end of each anodic lead and the distal end of said cathodic lead so that the cells of said cut slab are connected together in series.

42. A method as claimed in claim 21 further comprising the step of electrically connecting the distal end of each anodic lead and the distal end of said cathodic lead so that some of the cells of said cut slab are connected together in series and the remainder of cells is connected together in parallel.

43. A method as claimed in claim 40 further comprising the step of wrapping said cut slab and attached leads with standard packaging for lithium polymer batteries.

44. A method as claimed in claim 41 further comprising the step of wrapping said cut slab and attached leads with standard packaging for lithium polymer batteries.

45. A method as claimed in claim 42 further comprising the step of wrapping said cut slab and attached leads with standard packaging for lithium polymer batteries.

* * * * *